Nov. 8, 1932.  H. C. EDWARDS  1,886,384
DIESEL ENGINE
Filed Jan. 28, 1931
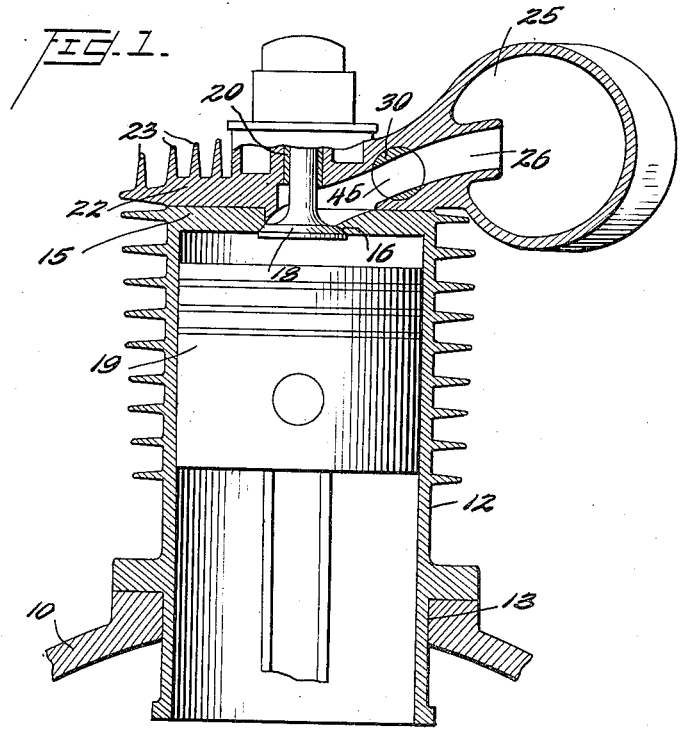
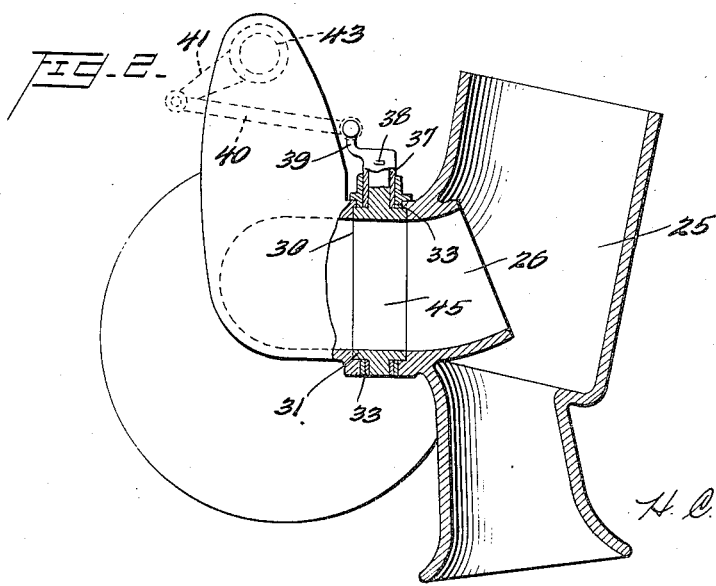
Inventor
H. C. Edwards,
By Watson, Coit, Morse & Grindle
Attorneys Patented Nov. 8, 1932

1,886,384

UNITED STATES PATENT OFFICE

HERBERT C. EDWARDS, OF DETROIT, MICHIGAN, ASSIGNOR TO PACKARD MOTOR CAR COMPANY, OF DETROIT, MICHIGAN, A CORPORATION OF MICHIGAN

DIESEL ENGINE

Application filed January 28, 1931. Serial No. 511,868.

This invention relates to internal combustion engines of the Diesel type in which the air which supports combustion within the engine cylinders and the gaseous products of such combustion enter and leave each cylinder through a single port therein.

It has heretofore been proposed, particularly in the use of this type of engine for the propulsion of aircraft, to provide a combined air and exhaust gas conduit for each cylinder communicating with the cylinder port, fresh air being introduced at one end of this conduit and passing into the port on the suction stroke, the exhaust gas from the cylinder being expelled through the port into the conduit and discharged from the opposite end of the conduit. For convenience these conduits are usually connected with the port through an intermediate passage, the conduit extending in a direction generally transverse of the passage and being connected intermediate its ends with the passage. In the use of these engines in aircraft the conduits are ordinarily so disposed as to utilize the stream of air directed rearwardly by the propeller to ensure constant circulation of air within the conduit and delivery of exhaust gas from the rear end thereof.

Difficulty has been experienced in adapting this type of engine to aircraft propulsion by reason of the high speed at which the Diesel engine ordinarily operates. It is found that the idling speeds of these engines are frequently too high to permit proper landing of the aircraft and manipulation thereof under certain conditions during flight.

It is therefore an object of the invention to provide a simple and efficient means for materially reducing the idling speed of a Diesel engine. A feature of the invention is the provision of means serving as an effective brake by retarding the flow of fresh air into and of exhaust gas from the cylinder, this braking means being preferably associated with the port through which the air and exhaust gas flow.

A more specific object of the invention is the provision of means for throttling the flow of gas and air through the passage ordinarily provided between the transversely extending conduit and the cylinder port in Diesel engines designed for the propulsion of aircraft.

Further difficulty has been experienced in the starting and idling of these engines by reason of the high temperature required for operation thereof. It is important to ensure that heat will be developed rapidly in the cold engine upon starting and that this heat may be retained when idling in order that the temperature developed by compression of the combustible mixture may be sufficiently high to properly ignite the mixture.

By means of the present invention the retention of heat within the cylinder and the prevention of undue cooling of the cylinder walls upon entry of the fresh air are ensured by the provision of the means hereinbefore mentioned for controlling the flow of air and exhaust gas through the cylinder port which also serves to overcome the difficulties incident to the normally high speed of operation of the Diesel engine.

Further objects and features of the invention will be apparent from the following description taken in connection with the accompanying drawing, in which Figure 1 is a longitudinal sectional view through an engine cylinder to which the invention has been applied; and Figure 2 is a plan view partly in section of the construction shown in Figure 1.

In the embodiment of the invention shown in the drawing for the purpose of illustration, the reference numeral 10 indicates the crankcase of a Diesel engine. This engine is of the radial type in which the cylinders 12 are seated in apertures 13 in the crankcase, this construction being found particularly suitable in enginges designed for use in the propulsion of aircraft. It will nevertheless be understood that the invention is in no way limited in its application to Diesel engines of any specific type. The cylinder 12 is preferably provided with an integral head 15 having a port 16 therein through which a charge of fresh air may be introduced and through which the exhaust gases are expelled. Suitable valve means 18 is provided for the opening and closing of this port in timed relation to the operation of the piston 19.

The specific construction of this valve means forms no part of the present invention but is illustrated in the drawing as consisting of a poppet valve which is supported for sliding movement within a bushing 20 in the upper portion of the cooling head 22 which is provided with fins 23 for the purpose of dissipating the excess heat developed in the cylinder during operation of the engine. The cooling head is of course secured in position on the cylinder in any suitable manner.

A conduit 25 extends transversely of the cylinder and is connected with the port 16 by a passage 26, the cooling head 22, the conduit 25, and the walls which define the passage 26 being preferably integral as illustrated in the drawing. The conduit shown in the drawing is of a particular type which has been found desirable for reasons with which the present invention is not concerned but it will be appreciated that a straight conduit extending transversely of the passage 26 and communicating therewith is sufficient to ensure proper operation of the engine.

As hereinbefore pointed out the invention contemplates the provision of means for retarding, controlling, or throttling the passage of air and exhaust gas through the port 16 so that the quantity of air admitted to the cylinder and exhaust gas expelled therefrom may be regulated if desired. In the form of the invention shown in the drawing this throttling means is illustrated as consisting of a valve 30, preferably of the plug type, and disposed in the passage 26 intermediate the conduit 25 and the port 16. It will be understood that the desired result may be obtained by other disposition of the valve 30 but the illustrated arrangement is particularly suitable when the invention is applied to the type of engine disclosed.

The valve consists of a plug or stem 31 rotatably supported in bushings 33 which are seated in apertures in the opposite walls of the conduit 26. A member 37 which is sleeved on one projecting end of the stem 31 and is pinned thereto as indicated at 38 is provided with an arm 39. A link 40 having articulated connections with the arm 39 and with an arm 41 on a rock shaft 43 serves as a convenient means for effecting rotation of the stem 31 to control the position thereof with accuracy, although it will be understood that the specific form of control means for this valve is not important.

The stem 31 is of course formed with the usual opening 45 therethrough, this opening being preferably as large as the passage 26 and of similar contour so that when the valve is moved to open position the gases may pass freely back and forth within the passage 26.

The operation and function of the device will now be apparent. As the valve 30 is adjusted toward closed position by manipulation of the rock shaft 43 and the control mechanism associated therewith, the flow of exhaust gas and air through the passage 26 will be retarded, a braking effect will thus be exerted upon the piston, the extent of braking effort being dependent upon the extent to which the valve 30 is adjusted toward the closed position. A very material reduction in the speed of operation of the engine is thereby effected so that aircraft to which this invention is applied may land without difficulty, the engine being operable at the low rate of speed necessary for this purpose.

It will also be understood that the partial closing of this valve, by retarding the flow of exhaust gas out of the cylinder, serves to retain a substantial proportion of the gas within the upper portion of the cylinder and a greater amount of heat is available for operation of the engine and combustion of the succeeding fresh charge. For this reason the temperature of the engine will be elevated more rapidly on starting and may be maintained more effectively during idling than is otherwise possible.

It will be understood that the embodiment of the invention disclosed herein is described in detail for the purpose of clearly illustrating the underlying principles thereof and that such alterations and changes are contemplated as fall within the spirit and scope of the appended claims.

Having thus described the invention, what is claimed as new and desired to be secured by Letters Patent is:

1. In a Diesel engine having a cylinder provided with a single port serving as an air inlet and exhaust gas outlet, the combination with a conduit communicating with and extending transversely of said port, and arranged to receive a supply of fresh air through the forward end and discharge exhaust gas through the rearward end thereof, of valve means for controlling said port in timed relation to the operation of said engine, and means for throttling the flow of air and exhaust gas through said port only.

2. In a Diesel engine having a cylinder provided with a single port serving as an air inlet and exhaust gas outlet, the combination with a conduit communicating with and extending transversely of said port, and arranged to receive a supply of fresh air through the forward end and discharge exhaust gas through the rearward end thereof, of valve means for controlling said port in timed relation to the operation of said engine, and means associated with said port for throttling the flow of air and exhaust gas therethrough.

3. A Diesel engine having a cylinder provided with a single port serving as an air inlet and exhaust gas outlet, a conduit communicating with and extending transversely of said port, and arranged to receive a supply of fresh air through the forward end and discharge exhaust gas through the rearward end thereof, a gas passage connecting said port and conduit, and throttling means associated with said passage.

4. A Diesel engine having a cylinder provided with a single port serving as an air inlet and exhaust gas outlet, a conduit communicating with and extending transversely of said port, and arranged to receive a supply of fresh air through the forward end and discharge exhaust gas through the rearward end thereof, a gas passage connecting said port and conduit, and throttling means associated with said passage, said throttling means comprising a valve of the plug type having an opening therein at least as large in cross-sectional area as the cross-sectional area of said passage and conforming thereto in contour, whereby said valve may be so set as to permit unimpeded flow of gas and air through said passage.

5. In a Diesel engine having a cylinder provided with a port in the head thereof through which fresh air may be introduced into the cylinder and exhaust gas expelled therefrom, the combination with a valve seating in said port and operable in timed relation to the operation of the engine to open and close said port, of a support for said valve associated with the cylinder head, a passage leading through said support and communicating with said port, a combined air and exhaust conduit communicating with said passage and extending transversely thereof, and means within said passage for throttling said passage.

6. In a Diesel engine having a cylinder provided with a port in the head thereof through which fresh air may be introduced into the cylinder and exhaust gas expelled therefrom, the combination with a valve seating in said port and operable in timed relation to the operation of the engine to open and close said port, of a support for said valve associated with the cylinder head, a passage leading through said support and communicating with said port, a combined air and exhaust conduit extending transversely of said passage, said passage communicating with said conduit intermediate the ends of the latter, and adjustable means associated with said passage for regulating the flow of fresh air and exhaust gas through said passage.

7. In a Diesel engine having a cylinder provided with a port in the head thereof through which fresh air may be introduced into the cylinder and exhaust gas expelled therefrom, the combination with a valve seating in said port and operable in timed relation to the operation of the engine to open and close said port, of a support for said valve associated with the cylinder head, a passage leading through said support and communicating with said port, a combined air and exhaust conduit formed integrally with said support and extending transversely with said cylinder, said conduit communicating at a point intermediate the ends thereof with said passage, and valve means disposed in said passage for regulating the flow of fresh air and exhaust gas therethrough.

8. In a Diesel engine having a cylinder provided with a single port serving as an air inlet and exhaust gas outlet, the combination with a conduit communicating with and extending transversely of said port, and arranged to receive a supply of fresh air through the forward end and discharge exhaust gas through the rearward end thereof, of means operable to retard the flow of air and exhaust gas through said port only to reduce the speed of operation of the engine.

In testimony whereof I hereunto affix my signature.

HERBERT C. EDWARDS.